(12) United States Patent
Seo et al.

(10) Patent No.: US 7,501,735 B2
(45) Date of Patent: *Mar. 10, 2009

(54) SELF-MAGNETIZED MOTOR AND STATOR STRUCTURE THEREOF

(75) Inventors: Moo Hong Seo, Changwon (KR); Jin Soo Park, Incheon (KR); Sung Ho Lee, Anyang (KR); Jang Ho Shim, Seoul (KR); Jae Min Kim, Seoul (KR); Jae Hak Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 82 days.

This patent is subject to a terminal disclaimer.

(21) Appl. No.: 11/646,331

(22) Filed: Dec. 28, 2006

(65) Prior Publication Data

US 2007/0152530 A1  Jul. 5, 2007

(30) Foreign Application Priority Data

Dec. 29, 2005  (KR) .................. 10-2005-0133881

(51) Int. Cl.
*H02K 1/00* (2006.01)
*H02K 21/12* (2006.01)
*H02K 19/00* (2006.01)

(52) U.S. Cl. .............. 310/216; 310/162; 310/163; 310/165; 310/166; 310/184

(58) Field of Classification Search ............ 310/156.78, 310/156.81, 162–163, 165–166, 184, 216
See application file for complete search history.

(56) References Cited

U.S. PATENT DOCUMENTS

| | | | | | |
|---|---|---|---|---|---|
| 3,062,978 | A | * | 11/1962 | Smith | 310/166 |
| 3,421,033 | A | * | 1/1969 | Hoffmeyer | 310/172 |
| 3,421,034 | A | * | 1/1969 | Hershberger | 310/172 |
| 3,633,056 | A | * | 1/1972 | Hoffmeyer | 310/180 |
| 4,296,344 | A | * | 10/1981 | Rabe | 310/184 |
| 4,454,438 | A | * | 6/1984 | Yamashita et al. | 310/162 |
| 6,566,784 | B1 | * | 5/2003 | Hsu | 310/254 |
| 6,888,282 | B2 | | 5/2005 | Ahn et al. | |
| 7,116,029 | B2 | | 10/2006 | Kerlin | |
| 7,161,270 | B2 | * | 1/2007 | Han et al. | 310/156.81 |
| 7,205,694 | B2 | * | 4/2007 | Mecrow | 310/168 |

FOREIGN PATENT DOCUMENTS

JP  07255158 A  * 10/1995

* cited by examiner

*Primary Examiner*—Tran Nguyen
(74) *Attorney, Agent, or Firm*—Ked & Associates, LLP

(57) ABSTRACT

A self-magnetized motor includes a stator adapted to rotate by electromagnetic interaction with a rotator, a plurality of slot teeth formed on and surrounding a through-hole of the stator, and an excitation pole adjacent at least one slot tooth having fewer projections than remaining ones of the slot teeth. The projections are formed on ends of the slot teeth facing the through-hole of the stator. According to one non-limiting embodiment, the excitation pole may be formed between two slot teeth having fewer projections.

19 Claims, 5 Drawing Sheets

SELF-MAGNETIZED MOTOR AND STATOR STRUCTURE THEREOF

BACKGROUND

1. Field

One or more embodiments described herein relate to motors.

2. Background

Different types of motors have been developed to serve a variety of needs. One common goal of designers is to improve the torque of motors while simultaneously keeping manufacturing costs low and efficiency high.

BRIEF DESCRIPTION OF THE DRAWINGS

The embodiments will be described in detail with reference to the following drawings, in which like reference numerals refer to like elements.

DETAILED DESCRIPTION

Figure 1:
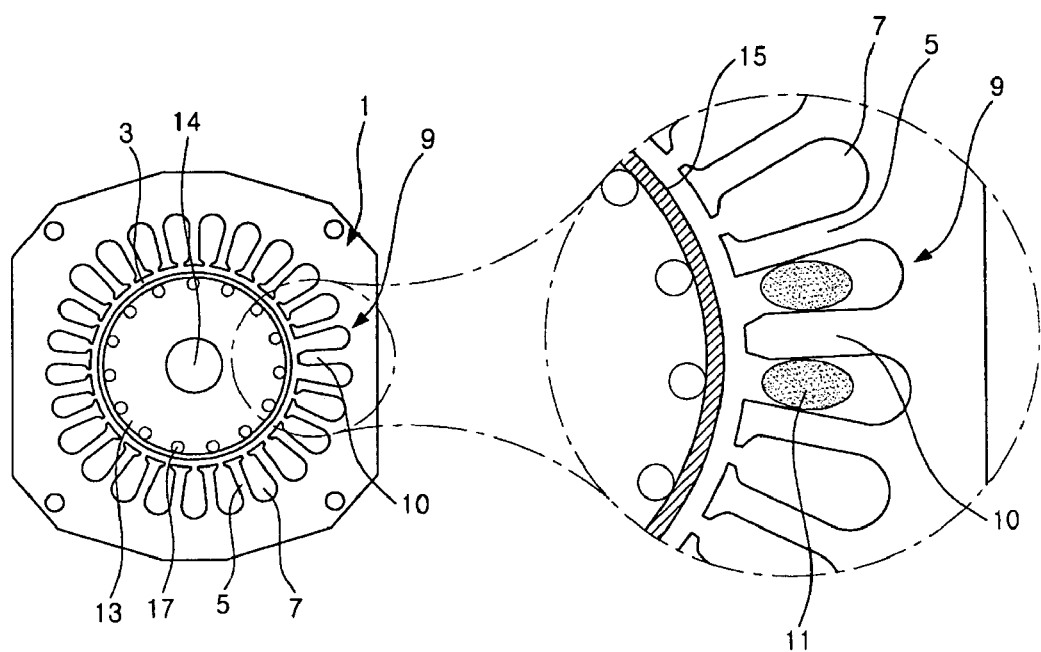
FIG. 1 is a diagram showing one type of self-magnetized motor.

FIG. 1 is a cross-sectional view of one type of self-magnetized motor. In this motor, a through-hole 3 extends through the center of a stator 1. A number of slot teeth 5 protrude to surround the inner surface of the through-hole, and slots 7 are defined between the slot teeth. Stator coils (not shown) are wound inside the slots, i.e., stator coils are wound around slot teeth 5 and positioned inside the slots. The stator coils are supplied with power to thereby establish a magnetic field.

As further shown in FIG. 1, leading ends of the slot teeth are wider than other parts of the teeth. That is, entrances of slots 7 are narrower than inner portions thereof. The slots extend through from the upper end of the stator to the lower end thereof.

The motor also includes an exciter 9 that extends from one side of the inner surface of the through-hole of the stator to the center of the through-hole. The exciter is positioned to replace one of the slot teeth, e.g., the exciter is disposed between two of the slot teeth. The exciter has an excitation pole 10 positioned in place of a tooth 5, and an excitation pole coil 11 is wound around the excitation pole. The exciter operates to supply a magnet layer 15 (described later) with magnetic flux to magnetize it constantly.

Also included is a rotator 13 positioned in the through-hole of the stator. The rotator may have an approximately cylindrical shape and is adapted to rotate by electromagnetic interaction with the stator. A constant interval may generally be maintained between the outer peripheral surface of rotator 13 and the inner peripheral surface of the stator. The inner peripheral surface of the stator is defined by an imaginary line connecting the leading ends of slot teeth 5.

The rotator has a hole 14 into which a shaft (not shown) is press-fitted. The rotator itself is a kind of magnet, having magnet layer 15 formed on its outer peripheral surface. The magnet layer is a kind of permanent magnet, and when excited by the exciter a constant magnetic force is established. Reference numeral 17 refers to bars.

A motor as described above exhibits complex characteristics of an inductor motor and a hysteresis motor during initial operation. However, when a predetermined speed is reached, exciter 9 magnetizes magnet layer 15 so that the motor operates as a permanent magnet motor. However, the self-magnetized motor of FIG. 1 has problems. For example, in order to increase driving torque, the degree of magnetization of magnet layer 15 must be increased. To this end, the following methods may be adopted.

First, magnetization intensity is increased by increasing the number of windings of excitation pole coil 11. This reduces the size of current under a predetermined voltage. As a result, the wire diameter of the excitation pole coil increases and so does the magnetization current. However, this is limited by the requirement of a slot interval between excitation pole 10 and slot teeth 5. The magnetization intensity may also be increased when magnet layer 15 is made of a material having good characteristics. However, this approach increases manufacturing costs.

Figure 2:
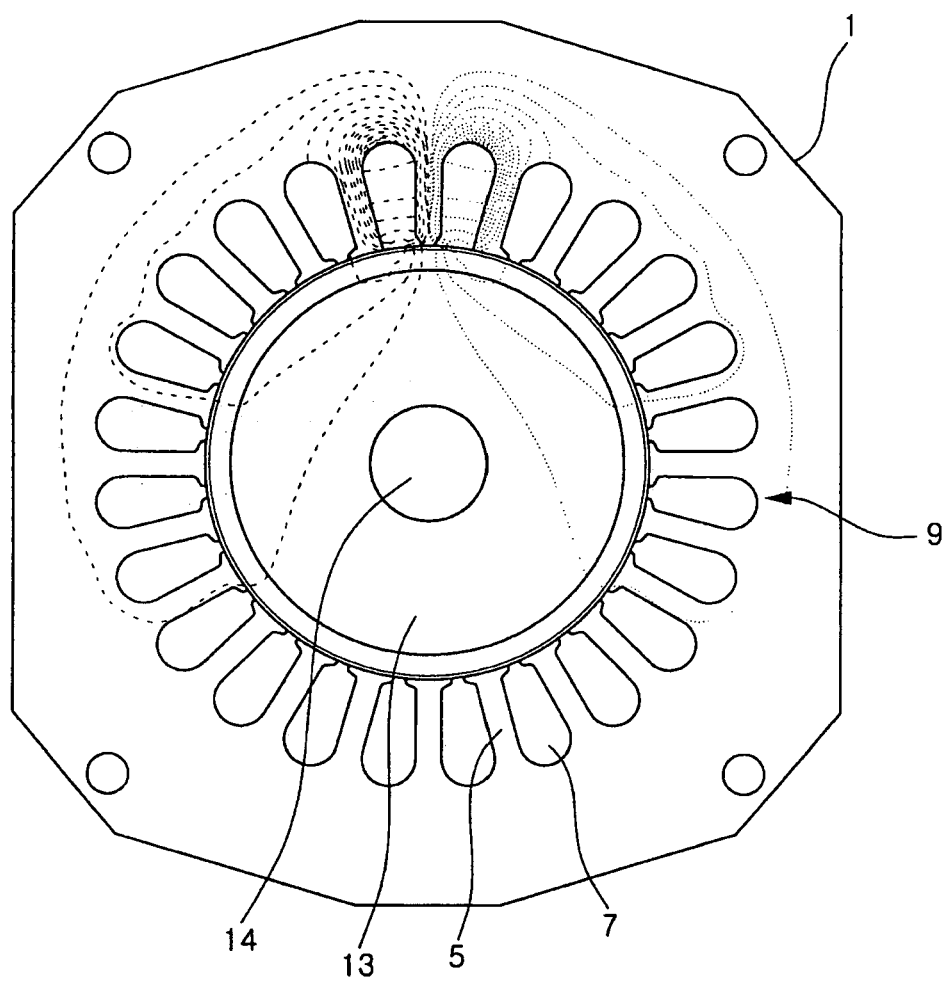
FIG. 2 shows leakage of magnetic flux that occurs in the motor of FIG. 1.

Meanwhile, the degree of excitation of magnet layer 15 increases when the magnetic flux from exciter 9 is transmitted to the magnet layer more efficiently. However, as clearly shown in FIG. 2, only a portion of the magnetic flux from the exciter is transmitted to magnet layer 15. In other words, the degree of magnetization of the magnet layer 15 is degraded. This is because a large amount of magnetic flux is transmitted to the stator through the leading ends of the slot teeth near the exciter.

Figure 3:
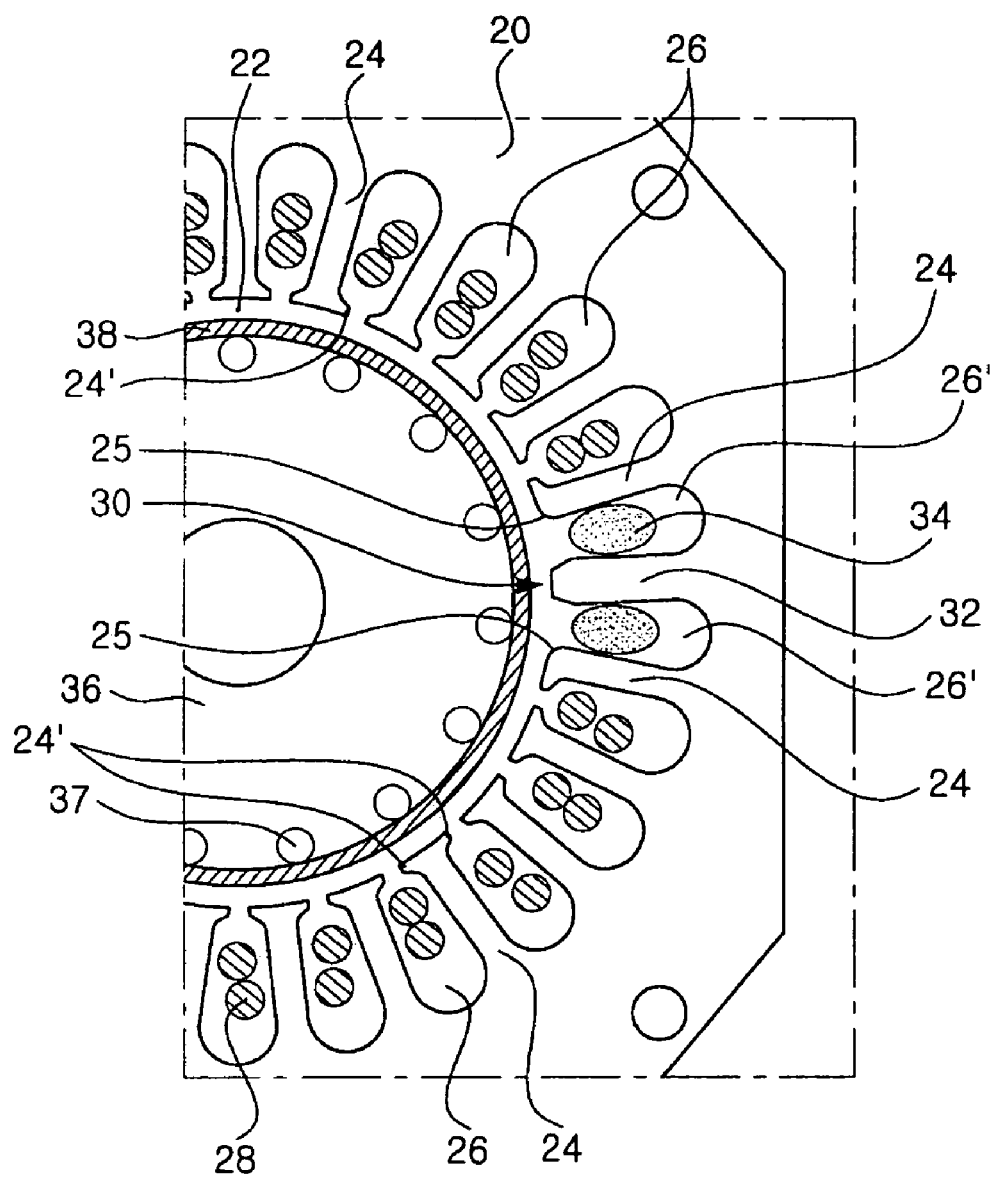
FIG. 3 is a diagram showing a partial cross-sectional view of a stator structure of another type of self-magnetized motor.
Figure 4:
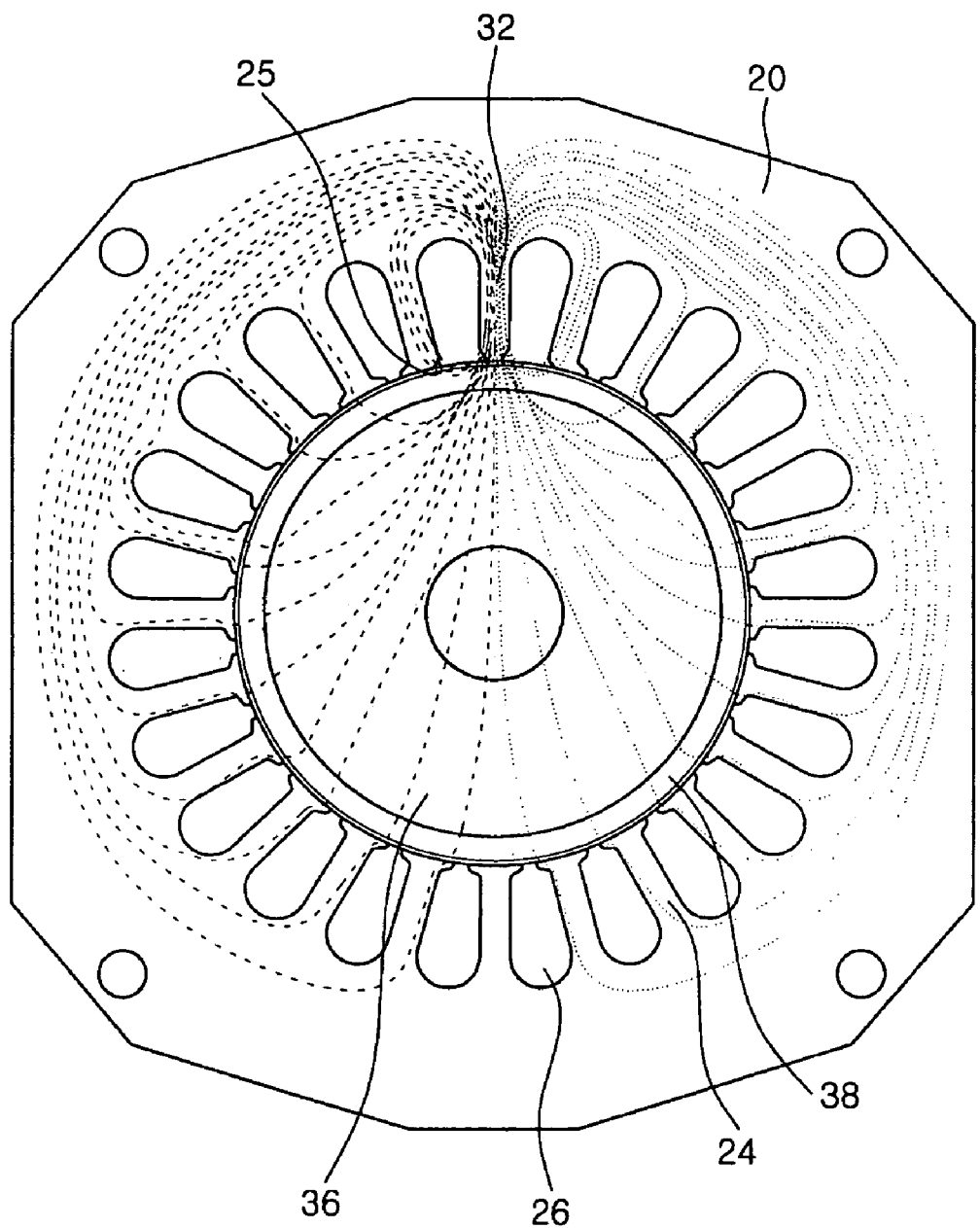
FIG. 4 shows the transmission of magnetic flux that may be achieved by the motor of FIG. 3.

FIGS. 3 and 4 show another type of self-magnetized motor. This motor includes a stator 20 having a through-hole 22 that extends through its center. The stator has an approximately cylindrical shape, and the through-hole has a circular section that extends from one end of the stator to the other end.

Slot teeth 24 are formed at predetermined intervals (e.g., a same interval) to surround an inner surface of the through-hole. Leading ends of the slot teeth extend towards the center of the through-hole. The slot teeth do not necessarily have the same size and their lengths or widths may vary or be the same depending on design requirements. Protrusions 24' extend from the leading ends of the slot teeth in a direction which is at least substantially perpendicular to the direction in which the slot teeth extend.

Slots 26 are defined between the slot teeth. The slots extend from one end of the stator to the other end, preferably in parallel with the through-hole. Because of the protrusions 24' formed on the slot teeth, the portions of slots 26 which are in communication with the through-hole are narrower than inner portions thereof.

Slot teeth 24 adjacent to an excitation pole 32 (which is included to form an exciter 30 described later) have cutouts 25 on their leading ends. The cutouts are formed by removing at least one protrusion 24' from leading ends of the slot teeth. As a result, portions of excitation slots 26', in communication with through-hole 22, become wider that other slots 26. As shown, excitation slots 26' are located on both sides of excitation pole 32 of the exciter. The cutouts 25 may be curved or have a different shape. When positioned adjacent the leading end of excitation pole 32, the cutouts serve to increase the sectional area of entrances of excitation slots 26' towards a rotator 36 (described later). If desired, cutouts 25 may be flat or have another type of structure or topology.

Coils 28 are wound inside slots 26. The coils are wound around the slot teeth and positioned inside the slots. When power is applied to the coils, a magnetic field is established in stator 20.

Exciter 30 is positioned on a part of the inner surface of through-hole 22 of the stator to extend towards the center of the through-hole. Excitation pole 32, which is included in exciter 30, is positioned to replace one of the slot teeth 24. That is, excitation pole 30 is disposed between two slot teeth, and preferably between one or more slot teeth having the cutouts previously described.

In accordance with one embodiment, excitation pole 32 has slot teeth on both sides thereof. In this configuration, excitation slots 26' are located on both sides of excitation pole 32 adjacent the slot teeth having the cutouts. The excitation pole may have a substantially constant width over much of its length, but the width may then gradually decrease (taper) towards the leading end. The leading end of excitation pole 32 may be positioned to coincide with leading ends of slot teeth 24 to define a virtual circle. The position of exciter 30 may vary depending on the design requirements. Also, in alternative embodiments, the motor may be formed to include more than one exciter disposed adjacent one or more slot teeth having cutouts.

An excitation pole coil 34 is wound around excitation pole 32 and is positioned in excitation slots 26', so as to reside on both sides of excitation pole 32 and adjacent slot teeth 24 having the cutouts. When power is applied to the excitation pole coil, the resulting magnetic flux is transmitted from excitation slots 26' to through-hole 22 through the widened entrances created by the cutouts. The flux then passes to a magnet layer 38 of rotator 36, which may be cylindrical.

The rotator is positioned inside the through-hole of the stator and rotates by electromagnetic interaction with the stator. The rotator may include stacked disk-shaped iron plates, with through-holes formed to extend through a periphery of the stacked disks. Aluminum bars 37 may be positioned in the through-holes. The aluminum bars may serve to generate a magnetomotive force for rotator 36. A shaft may be press-fitted into the center of the rotator, and the rotator may be spaced a predetermined distance from the inner surface of through-hole 22, for example, from an imaginary circle defined by leading ends of slot teeth 24.

The rotator may also include magnet layer 38 positioned on its outer surface, and particularly on the surface facing the inner surface of through-hole 22. The magnet layer preferably surrounds the surface of rotator 36 and has a predetermined thickness. The magnet may be a permanent magnet and is magnetized by magnetic flux transmitted by exciter 30.

In operation, rotator 36 rotates by electromagnetic interaction with stator 20. The self-magnetized motor exhibits complex characteristics of an inductor motor and a hysteresis motor during initial operation. When a predetermined speed is reached, exciter 30 magnetizes magnet layer 38 so that the self-magnetized motor operates as a permanent magnet motor.

Figure 5:
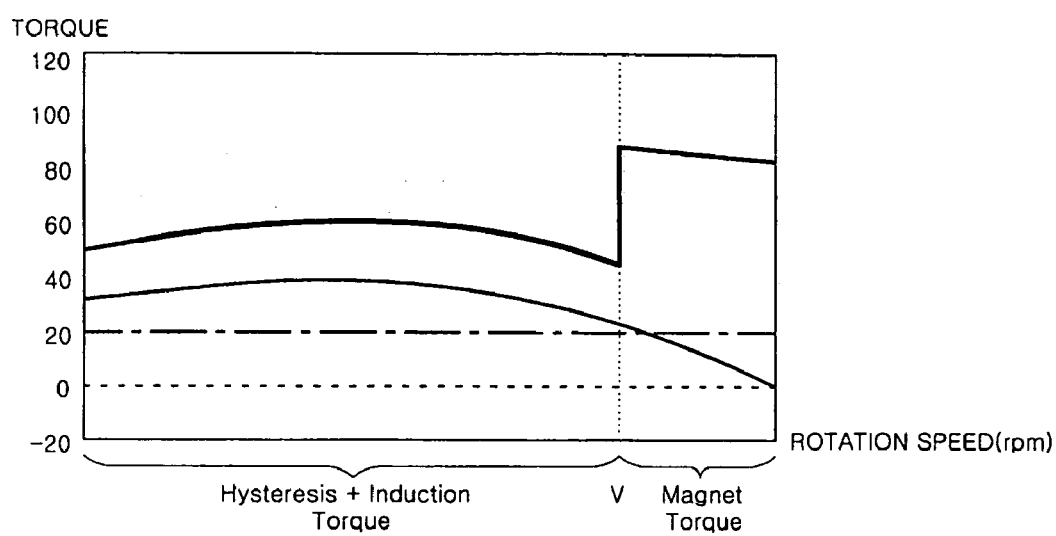
FIG. 5 is a graph showing an exemplary set of operational characteristics that may be achieved by the self-magnetized motor.

FIG. 5 is a graph showing operational characteristics of the self-magnetized motor. In the graph, the abscissa designates rotational speed and the ordinate designates torque. Also, the straight single-dot chain line indicates torque characteristics of a hysteresis motor and the curved solid line indicates torque characteristics of an induction motor. The thick solid line indicates the torque of the self-magnetized motor, which has complex characteristics of a hysteresis motor and a induction motor, as a function of rotational speed.

When the rotational speed reaches a value V (as indicated by the dotted vertical line) during operation of the self-magnetized motor, exciter 30 magnetizes magnet layer 38 of the rotator and increases the torque greatly. Particularly, when power is applied to excitation pole coil 34 of the exciter 30, the resulting magnetic flux is transmitted to magnet layer 38, which is then magnetized so that the self-magnetized motor is driven like a permanent magnet motor. The torque, therefore, abruptly increases when the rotational speed of the motor reaches V.

Referring again to FIG. 4, magnetic flux from exciter 30 magnetizes magnet layer 38. Particularly, when power is applied to excitation pole coil 34 of the exciter, most of the resulting magnetic flux is transmitted from excitation pole 32 to the magnet layer. Accordingly, the magnetic flux from excitation pole 32 is not at all or is hardly transmitted to the adjacent slot teeth having the cutouts. This is because cutouts 25 formed on leading ends of the slot teeth (adjacent to excitation pole 32) increase the interval (e.g., spacing) between the excitation pole and leading ends of slot teeth. As such, the magnetic flux from exciter 30 is mostly transmitted to magnet layer 38 to thereby increase the degree of magnetization of the magnet layer. Therefore, the motor can exhibit greater torque.

At least one embodiment of the self-magnetized motor and its stator structure may therefore be applied to achieve improved performance. These performance characteristics may be achieved, for example, as a result of the cutouts along leading ends of the slot teeth of the stator. These cutouts, which are adjacent to the excitation pole of the exciter, cause magnetic flux from the excitation pole to be transmitted fully or mostly to the magnet layer of the rotator, not to adjoining slot teeth. As a result, the driving torque of the self-magnetized motor may increase greatly when the rotational speed exceeds a threshold.

According this or an alternative embodiment, a self-magnetized motor may therefore be formed to include a stator having a through-hole formed in the stator, slot teeth formed around an inner surface of the through-hole towards a center of the through-hole, and coils wound around the slot teeth; a rotator positioned in the through-hole of the stator, the rotator rotating by means of an electromagnetic interaction with the stator; an exciter having an excitation pole positioned in place of one of the slot teeth of the stator and an excitation pole coil wound around the excitation pole; and a magnet layer formed on a surface of the rotator and selectively magnetized by the exciter, wherein cutouts are formed on leading ends of the slot teeth adjacent to the excitation pole, the leading ends corresponding to the excitation pole. The cutouts are formed on facing ends of the slot teeth positioned on both ends of the excitation pole. The cutouts are curved and/or may be flat.

According to another embodiment, a stator structure for a self-magnetized motor may comprises a stator adapted to rotate a rotator by means of an electromagnetic interaction with the rotator, slot teeth arranged to surround an inner surface of a through-hole, the rotator being seated on the through-hole, leading ends of the slot teeth facing a center of the through-hole, the slot teeth defining slots; and an excitation pole positioned in place of one of the slot teeth so as to constitute an exciter, wherein cutouts are formed on an end of leading ends of the slot teeth adjacent to the excitation pole. The cutouts are formed on facing ends of the slot teeth positioned on both ends of the excitation pole.

The excitation pole has a width gradually decreasing towards a leading end, and the leading end of the excitation pole coincides with a virtual circle defined by the leading ends of the slot teeth. The cutouts may be curved and/or flat. By way of background, U.S. Pat. Nos. 6,888,282 and 7,116,029 are examples of references that provide a description of additional components that may be included in the embodiments of the motor and/or stator described herein including control circuits that may be included for the motor. The contents of these exemplary references are incorporated herein by reference.

Any reference in this specification to "one embodiment," "an exemplary," "example embodiment," "certain embodiment," "alternative embodiment," and the like means that a particular feature, structure, or characteristic described in connection with the embodiment is included in at least one embodiment as broadly described herein. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A self-magnetized motor comprising:
   a stator having a through-hole;
   a plurality of teeth extending from the stator towards the through-hole;
   coils windings around the teeth;
   a rotator, disposed in the through-hole, to impart rotational force to a shaft based on electromagnetic interaction with the stator;
   an exciter having an excitation pole between two of the teeth and an excitation pole coil wound around the excitation pole; and
   a magnet layer, on a surface of the rotator, which is magnetized by the exciter,
   wherein a first number of teeth include multiple protrusions on ends facing the through-hole and a second number of teeth include one or fewer protrusions on ends facing the through-hole, and wherein the excitation pole is adjacent at least one of the second number of teeth.

2. The self-magnetized motor of claim 1, wherein the excitation pole is disposed between and adjacent to two of the second number of teeth.

3. The self-magnetized motor of claim 1, wherein a spacing between an end of the excitation pole and an end of at least one of the second number of slot teeth is wider than a spacing between ends of the first number of teeth.

4. The self-magnetized motor of claim 3, wherein said wider spacing allows at least substantially all of the magnetic flux to pass from the exciter to the magnet layer on the rotator, bypassing said at least one of the second number of teeth.

5. The self-magnetized motor of claim 3, wherein said at least one of the second number of teeth have one protrusion, said one protrusion extending in a direction opposite to a location of the excitation pole to form said wider spacing.

6. The self-magnetized motor of claim 1, wherein each of the first number of slot having two protrusions extending in substantially opposite directions, said two protrusions further being at least substantially perpendicular to a direction in which a corresponding one of the first teeth extend.

7. The self-magnetized motor of claim 1, wherein the excitation pole has a tapered end.

8. The self-magnetized motor of claim 1, wherein each of the second number of teeth having a curved end facing the excitation pole.

9. The self-magnetized motor of claim 8, wherein the curved end is flat.

10. A stator structure for a self-magnetized motor, comprising:
    a stator adapted to rotate by electromagnetic interaction with a rotator;
    a plurality of teeth formed on and surrounding a through-hole of the stator, the teeth defining slots for receiving coil windings; and
    an excitation pole adjacent at least one tooth having fewer projections than remaining ones of the teeth, said projections formed on ends of the teeth facing the through-hole of the stator.

11. The stator structure of claim 10, wherein the excitation pole is formed between two teeth having said fewer projections.

12. The stator structure of claim 10, wherein said at least one tooth has one projection.

13. The stator structure of claim 12, wherein a first side of said at least one tooth which faces the excitation pole does not include the one projection.

14. The stator structure of claim 13, wherein a second side of said at least one tooth opposite the first side includes the one projection.

15. The stator structure of claim 13, wherein a spacing between the first side and the excitation pole is wider than a spacing between remaining ones of the teeth that are adjacent to each other.

16. The stator structure of claim 15, wherein said wider spacing allows at least substantially all the magnetic flux from the excitation pole to pass to a magnet layer formed on a rotator disposed within the through-hole, said substantially all the magnetic flux bypassing said at least one adjacent tooth.

17. The stator structure of claim 10, wherein the excitation pole has a tapered end.

18. The stator structure of claim 10, wherein said at least one tooth has a curved end facing the excitation pole.

19. The stator structure of claim 18, wherein the curved end is flat.

* * * * *